V. H. STOTT AND L. SCHOFIELD.
WATER HEATER.
APPLICATION FILED AUG. 22, 1921.

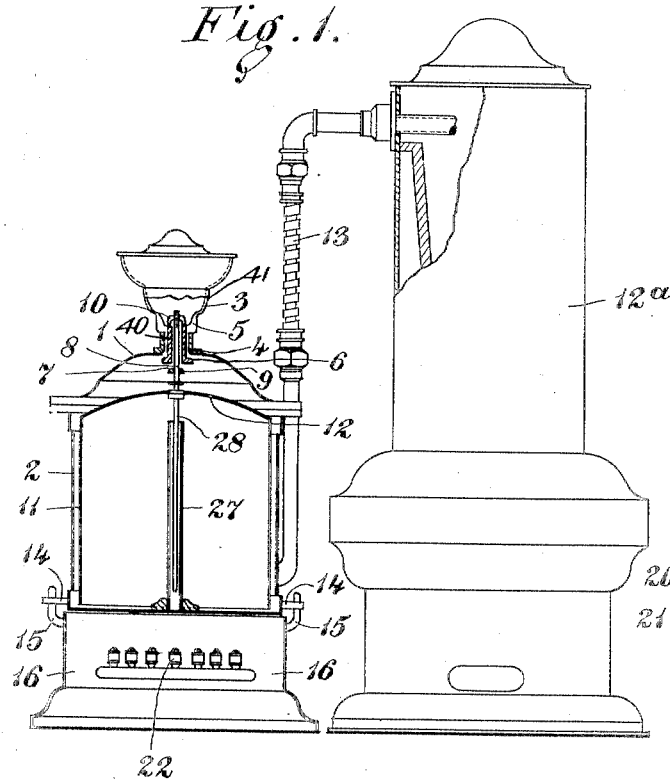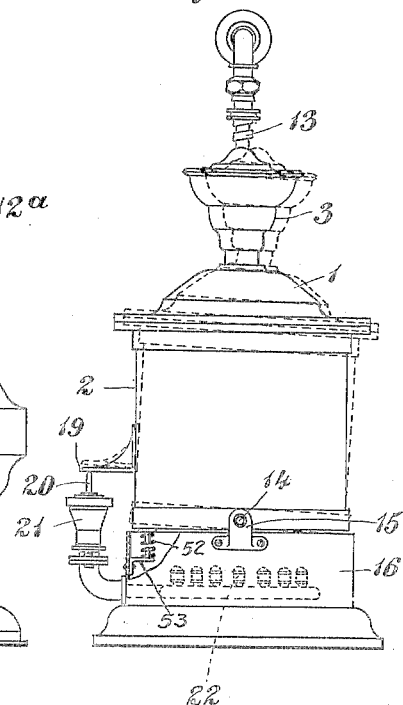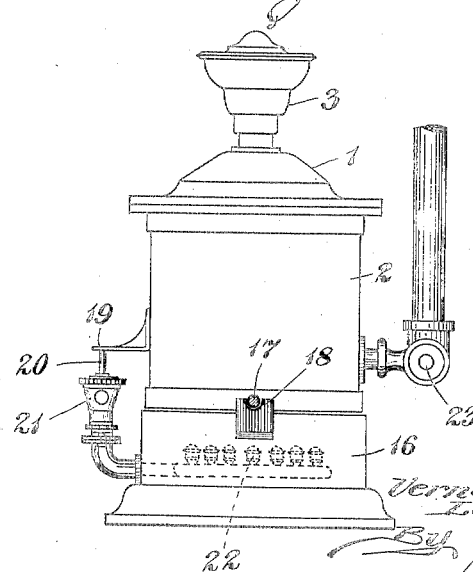

1,415,728.

Patented May 9, 1922.
4 SHEETS-SHEET 2.

Inventors
Vernon Haywood Stott
Lee Schofield
Attorney

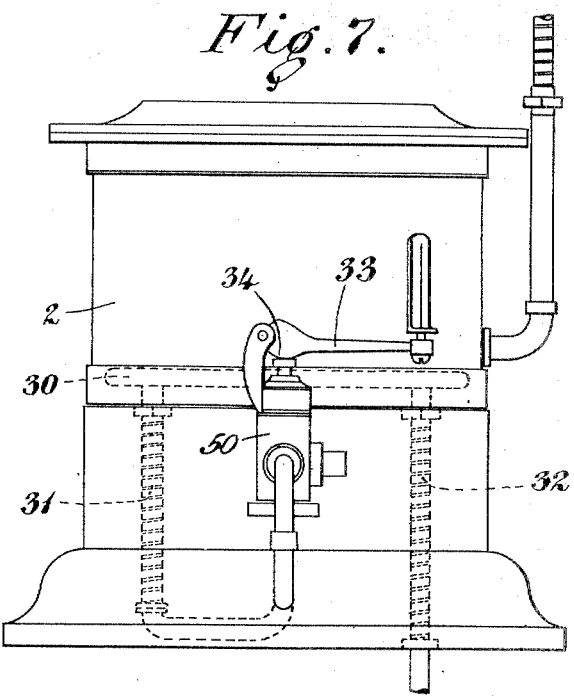
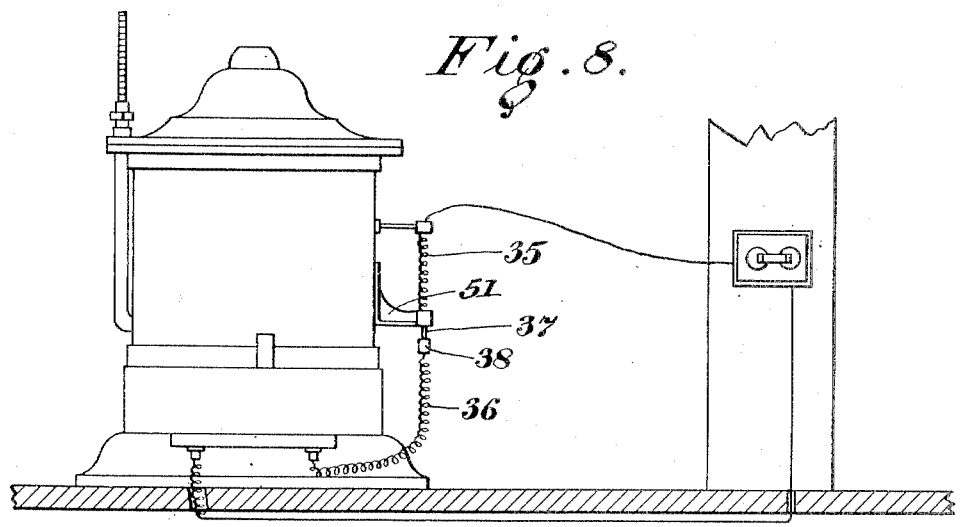

V. H. STOTT AND L. SCHOFIELD.
WATER HEATER.
APPLICATION FILED AUG. 22, 1921.

1,415,728.

Patented May 9, 1922.
4 SHEETS—SHEET 4.

Inventors
Vernon Heywood Stott and
Lee Schofield,
by
Attorney.

UNITED STATES PATENT OFFICE.

VERNON HEYWOOD STOTT AND LEE SCHOFIELD, OF OLDHAM, ENGLAND.

WATER HEATER.

1,415,728.  Specification of Letters Patent.  Patented May 9, 1922.

Application filed August 22, 1921. Serial No. 494,331.

*To all whom it may concern:*

Be it known that VERNON HEYWOOD STOTT and LEE SCHOFIELD, subjects of the King of Great Britain, residing at Oldham, Lancashire, England, have invented certain new and useful Improvements in Water Heaters, of which the following is a specification.

This invention relates to that class of water heaters wherein the source of heat is controlled according to the pressure of steam in the apparatus.

The object of this invention is to construct an apparatus, such as employed for infusing coffee, tea and the like, wherein the boiling water is automatically supplied to the infusion vessel, chamber, extractor or other vessel and the amount of heat supplied to the boiler is automatically reduced when the boiler is empty and until it is refilled.

In carrying out this invention we provide a base having a gas burner or other source of heat and a spring actuated valve or equivalent controlling the supply of fluid to said gas burner or source of heat. The boiler is positioned above the base and connected thereto in such a manner that it can have a rocking motion for controlling the spring valve. The boiler also has an air escape valve, a water inlet and an outlet or a connection to the infusing vessel, a float being positioned within the boiler and capable of either directly or indirectly closing the air escape valve at the boiling point so as to permit the generation of sufficient steam pressure within the boiler to eject the boiling water therefrom.

Our invention will be clearly understood from the following description aided by the examples shown on the annexed drawings in which:

Figure 1 is a view, partly in elevation and partly in section, of one form of an apparatus embodying the invention and wherein a flexible connection between the boiler and the infusion vessel is employed.

Fig. 2 is an end elevation of the apparatus shown in Fig. 1, the infusion vessel being omitted.

Fig. 3 is a side elevation of a modified form of the apparatus showing a swivel connection from the boiler to the infusion vessel, the infusion vessel itself being omitted.

Fig. 7 is a side view showing the invention applied to a steam heated boiler.

Fig. 8 is a side view showing the invention applied to an electrically heated boiler.

Figure 9:
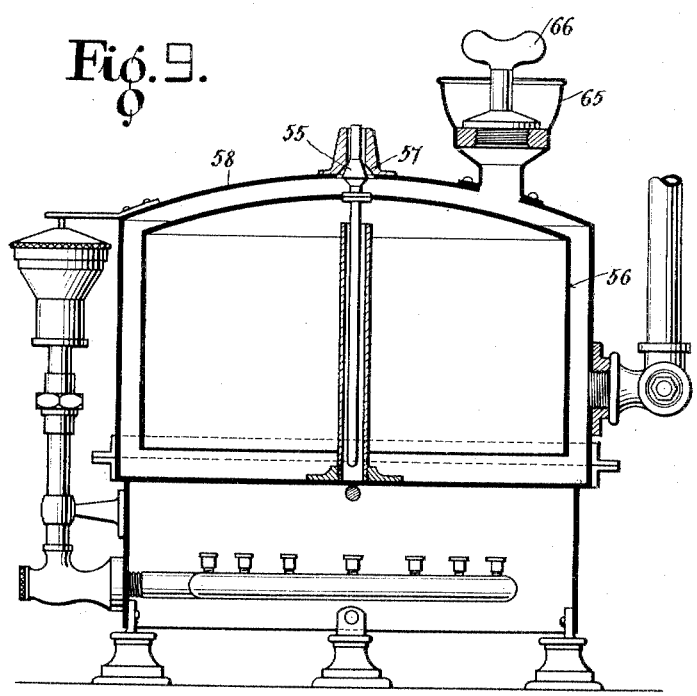
Fig. 9 is a sectional view of a modified form of boiler wherein the air valve is carried directly on the float and the seat for the same secured to the top of the vessel.
Figure 10:
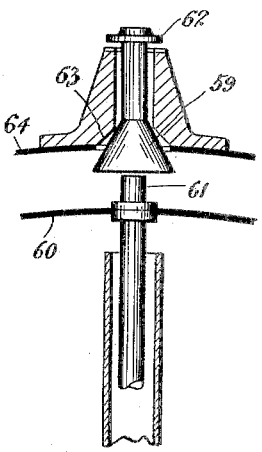
Fig. 10 shows a modified form of valve for use in the embodiment shown in Figure 10.

Referring to the several figures and Fig. 1 in particular, we insert or fix in the top or cover 1 of the boiler 2 a suitable form of air valve 40 which loosely hangs in position, and by virtue of its own weight rests clear of its seating and keeps the air passage 41 open. Alternatively the valve could be carried in the crown of the float with its seating in the top of the boiling vessel as shown in Figure 9.

Figure 6:
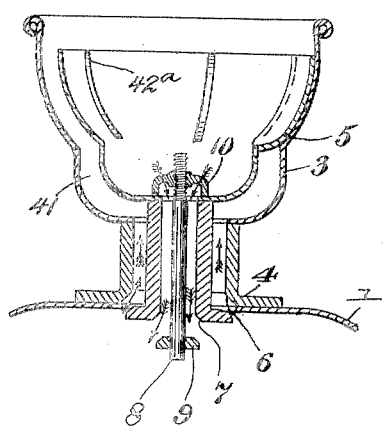
Fig. 6 is a sectional view, on an enlarged scale, of the preferred form of air valve.

In the preferred form of valve as shown in Figures 1 and 6 we employ a cup or funnel 3 attached to the cover 1 of the boiler 2 and having a valve seating 4, and in this cup is positioned an inner cup or funnel 5 carrying a depending tube and flange having a valve face 6 and a valve seating 7, the valve face 6 of which can close against the valve seating 4.

A rod 8 carrying a valve 9 extends through the tube which depends from the funnel 5 and is guided in its movement by a bridgepiece 10.

In the position shown in Figures 1 and 6 the boiler is ready for filling with water which enters through the cup 5 and tube and the air displaced in the boiler escapes through the space 41 between the cup 5 and tube and the outer cup 3. The cup or funnel 5 may have external ribs 42[a] which engage the interior of the cup or funnel 3 to keep said parts separated and permit the escape of air therebetween.

In the interior of the boiler 2 we place a float 11 of cuplike formation, preferably of a diameter which allows just sufficient clearance space between said float and the interior of the boiler 2 to permit the float to rise and fall.

The float 11 is provided with a small relief hole 12 and the boiler 2 is connected by means of a pipe 13 with an infusion vessel or chamber 12a.

We construct the apparatus with the boiling vessel 2 free to rock upon the base 16, so as to produce a hinge-like movement for controlling the fluid supply to the heating means.

Figure 4:
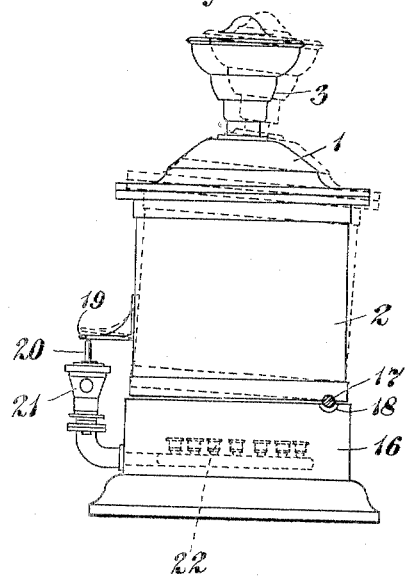
Fig. 4 is a side elevation of a further modified form of boiler.

This we may accomplish as in Figure 1 by attaching pivot pins 14, 14 or other suitable projection pieces to the boiler 2 which pivot pins are supported by bearing pieces 15, 15 carried on the base 16. Alternatively, and as shown in Figure 4, the boiler may be formed with a bearing pin 17 which rests in a recessed portion 18 of the base 16.

It will be understood that any other suitable form or means may be employed which will allow the boiler 2 to rock upon the base.

Attached to the boiler 2 is a lug 19 or other suitable projection which may act upon a stem 20 controlling a spring operated gas valve 54 in a valve casing 21 attached to the base 16.

Figure 11:
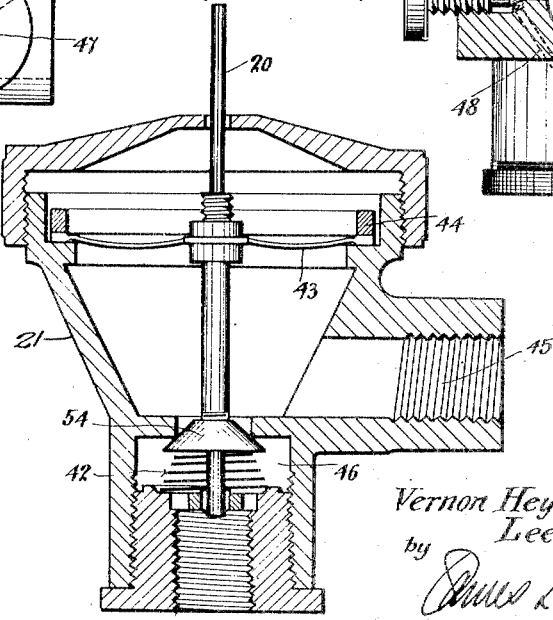
Fig. 11 is a cross-sectional view of the valve for controlling the flow of gas to the heating burner.

Referring to Figure 11, the tension of the valve spring 42 normally maintains the valve 54 in closed position, and the stem 20 in the raised position until the volume or weight of water poured into the boiling chamber 2 becomes sufficient to rock the boiler 2 sufficiently for the lug 19 to depress the stem 20 and compress the spring 42 and thus open the gas way to the burners 22. Gas is prevented from escaping around the valve stem 20 by a diaphragm 43 attached to the valve stem 20 and clamped on valve chamber 21 by the ring 44.

After each infusion or removal of the water the supply of gas to the burner is closed off again.

The hinge-like movement of the boiler requires a free ended outlet pipe at the infuser, or the provision of a flexible tube piece 13 as in Figure 1, or the movement may be permitted by a form of swivel joint 23 at some convenient point as in Figure 3.

Figure 5:
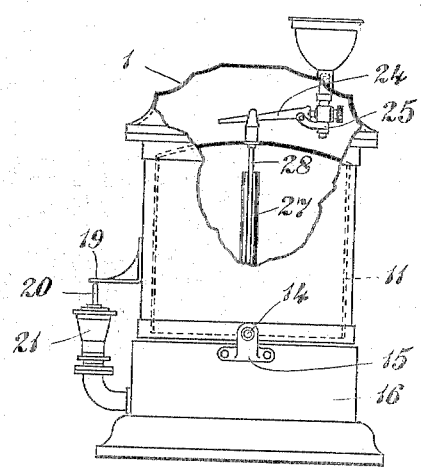
Fig. 5 is a view, partly in elevation and partly in section, showing a modified form of means for actuating the air valve.

Instead of the float actuating the air escape valve directly the float may, as in Figure 5, operate the valve through a lever 24 pivotally carried in a bracket 25 attached to the cover or any other suitable means for operating the valve may be employed so long as the action of the float opens and closes the air way through the crown or top of the boiling vessel. It is obvious that when this valve is made sufficiently large in area and to permit the escape of air from the boiler, and when the air inlet valve surrounds a suitable receiver, a very convenient means is provided for filling the boiler with water either by hand or by an automatic device without the necessity of the usual filling cup and tap, the automatically operated valve naturally performing the function of a tap for opening and closing the air or water way.

The spring 42 for the valve 54 in the casing is of sufficient strength to support the boiler 2, or if necessary a separate spring may be employed between the boiler 2 and base 16 to maintain the boiler in tilted position, or the boiler 2 may be weighted or the hinges may be so positioned that the boiler 2, when empty, will tilt to permit the valve 54 to close and its stem 20 to rise.

27 is a guide tube fixed to the bottom of the boiler 2 and 28 a rod attached to the float 11 and capable of moving in said tube 27 to ensure a straight up and down movement of the float 11. It is obvious that suitable vertical guide strips may be attached to the outer wall of the float or to the inner wall of the boiler.

Supposing the boiler 2 to be empty, it will assume the position shown in dotted lines Figures 2 and 4 with the valve 21 closed. Water is now introduced into boiler 2 through the filling cup 5 and the displaced air can escape through the space 41 between the cups 3 and 5, if this type of valve is employed. When sufficient water has been introduced into the boiler the weight thereof will cause the boiler 2 to rock on its bearings and through the lug 19 and stem 20, open the valve 54 to permit full flow of gas to the burners 22, the vapour of expansion escaping through the small relief hole 12 in the float 11 and the air valve in the cover.

When boiling commences and sufficient pressure is generated under the float 11, the latter rises and moves the valve 9 and valve face 6 against their respective seatings 7 and 4, thus closing the passageways for the inlet of water and escape of air, and there being no other outlet the pressure of steam will force the boiling water through the pipe 13 into the infusion vessel 12a.

As soon as the water passes to the infusion vessel 12a the weight is relieved from the boiler 2 which immediately tilts and allows the gas valve 54 to close and cut off the supply of gas to the burners 22.

Figure 12:
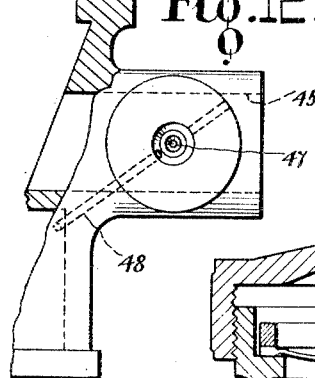
Figs. 12 and 13 are sectional views of the by-pass for permitting gas to flow to the pilot light.
Figure 13:
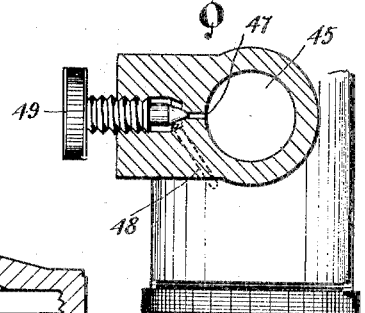

A by-pass burner or pilot light may be employed. A by-pass is shown in Figures 12 and 13 in which the inlet for gas 45 is shown as connected to discharge passage 46 through passages 47 and 48 and controlled by valve 49. Sufficient gas may be admitted directly through this by-pass to keep the gas flame lighted and the intensity of the flame may be regulated by valve 49.

Although we have described the apparatus as employing gas, it will be understood that any other suitable heating medium may be employed such as steam, oil or spirit.

In Figure 7 we show the application of steam as the heating medium. In this case the steam coil 30 is attached to the boiler 2, the live steam passing through the valve chamber 50 and flexible pipe 31 to the coil 30 and away by the flexible pipe 32.

The valve chamber 50 is fixed to the base 16 and operated by a lever 33 and cam 34.

The connection 13 between the boiler 2 and infusion vessel 12ª is shown on the drawings as occupying a vertical position but it will be understood it may be placed horizontally or angularly to meet any special or particular position of the infusing vessel or chamber, so long as the requisite flexibility is obtained.

The boiler 2 may be filled by hand or otherwise.

The apparatus is particularly suitable for the employment of an electric heating medium as shown in Figure 8 in as much as the coiling leads or current conveying wires 35, 36 provide all the flexibility required by the rocking or rising and falling movement of the boiler, the lug 51 carrying a contact 37 which can make or break with a fixed contact 38 as the boiler rises or falls.

In Figure 2 is shown an auxiliary spring 52 resting on bracket 53 and having its other end engaging the bottom of boiler 2 and assisting spring 42 in shutting gas supply valve 54 by tilting boiler 2 when the same is empty.

What we do claim as our invention and desire to secure by Letters Patent is:—

1. A water heater having means for ejecting boiling water therefrom comprising a boiler, a discharge pipe for boiling water, an air and steam escape passage normally open, a valve for closing said passage and means for actuating said valve to close said passage to cause steam pressure generated within said boiler to eject the boiling water therefrom.

2. A water heater having means for ejecting boiling water therefrom comprising a boiler, a discharge pipe for boiling water, a water inlet passage, an air and steam escape passage, valves for closing said water inlet and air and steam escape passages and means for actuating said valves to close said passages whereby steam generated within said boiler will eject the boiling water therefrom.

3. A water heater having means for ejecting boiling water therefrom comprising a boiler, a discharge pipe for boiling water, an air and steam escape passage, a valve for closing said passage and means for actuating said valve, said means comprising a float of the diving bell type.

4. A water heater having means for ejecting boiling water therefrom comprising a boiler, a discharge pipe for boiling water, an inlet passage for water, an escape passage for air and steam, valves for closing said passages and means for actuating said valves, said means comprising a float of the diving bell type mounted within said boiler and associated with said valves.

5. A water heater having means for ejecting boiling water therefrom comprising a boiler, a discharge pipe for boiling water, an escape passage for air and steam normally open, a valve for closing said passage and means for entrapping steam generated within said boiler to actuate said valve.

6. A water heater having means for ejecting boiling water therefrom comprising a boiler, a discharge pipe for boiling water, a water inlet passage, an air and steam escape passage, valves for closing said passages and means for entrapping steam generated within said boiler to actuate said valves.

7. A water heater having means for ejecting water therefrom comprising a boiler, a discharge pipe for boiling water, an air and steam escape passage normally open, means for closing said passage and means for entrapping steam to actuate said closing means comprising a bell substantially filling the boiler, open at its lower end and associated at its upper end with said closing means.

8. A water heater having means for ejecting boiling water therefrom comprising a boiler, a discharge pipe for boiling water, a water inlet passage, an air and steam escape passage, closing means for said passages and means for entrapping steam generated in said boiler to actuate said closing means comprising a diving bell substantially filling the boiler, open at its lower end and associated at its upper end with said closing means.

9. A water heater having means for ejecting boiling water therefrom comprising a boiler, a discharge pipe for boiling water, an air and steam escape passage normally open, means for closing said escape passage and means for actuating said closing means, said actuating means comprising a bell open at its lower end and having a bleed hole in its top, said bell being associated at its upper end with said closing means.

10. A water heater having means for ejecting water therefrom comprising a boiler, a discharge pipe for boiling water, a water inlet passage, an air and steam escape passage, closing means for said passages, means for entrapping steam generated in said boiler to actuate said closing means, said entrapping means comprising a bell open at its lower end and having a bleed hole at its upper end, said bell being associated at its upper end with said closing means.

11. In a water heater in combination, a boiler, means for heating said boiler, a passage normally open to allow escape of steam from said boiler, means controlled by the water level in the boiler for closing said passage whereby steam generated within said boiler will eject the water therefrom and means for shutting off said heating means when water is ejected from the boiler.

12. In a water heater in combination a boiler, means for heating said boiler, a passage normally open to allow escape of steam from said boiler, means adapted, when the water in the boiler reaches a predetermined level, to close said passage whereby steam generated within said boiler will eject the water therefrom and means for shutting off said heating means when said boiler is emptied and turning on said heating means when said boiler is refilled.

13. In a water heater in combination, a boiler, means for heating said boiler, means for controlling said heating means to shut the heat off when the boiler is empty and turn the heat on when the boiler is filled, a discharge passage for boiling water, a passage for the escape of air and steam from said boiler normally open, means for closing said passage and means for entrapping steam to actuate said closing means whereby steam generated within said boiler will eject the boiling water therefrom.

14. In a water heater in combination, a boiler, means for heating said boiler, means for controlling said heat to turn the heat on when the boiler is full and shut off the heat when the boiler is empty, a discharge passage for boiling water, an inlet passage for water to said boiler, an escape passage from air and steam for said boiler, closing means for said passages and means for operating said closing means when the steam within said boiler reaches a predetermined pressure.

15. In a water heater in combination, a boiler, means for heating said boiler, means for controlling said heating means to shut the heat off when the boiler is emptied and turn the heat on when said boiler is being filled, a discharge passage for boiling water, an inlet passage for water, an air and steam escape passage, valves for closing said passages, and operating means for said valves, said operating means comprising a float open at its lower end and having a bleed hole in its end.

In testimony whereof we have hereunto set our hands in presence of the subscribing witness.

VERNON HEYWOOD STOTT.
LEE SCHOFIELD.

Witness:
JAMES PARSONS.